(12) United States Patent
Zhang et al.

(10) Patent No.: US 12,148,449 B1
(45) Date of Patent: Nov. 19, 2024

(54) LAYOUT ADJUSTMENT METHOD AND APPARATUS, DEVICE, STORAGE MEDIUM, AND PROGRAM PRODUCT

(71) Applicant: Beijing Zitiao Network Technology Co., Ltd., Beijing (CN)

(72) Inventors: Yu Zhang, Beijing (CN); Zhijun Cai, Beijing (CN); Yifei Chen, Beijing (CN); Yijing Lin, Beijing (CN); Jianing Xu, Beijing (CN); Zheng Zhen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 0 days.

(21) Appl. No.: 18/389,731

(22) Filed: Dec. 19, 2023

Related U.S. Application Data

(63) Continuation of application No. PCT/CN2023/132504, filed on Nov. 20, 2023.

(30) Foreign Application Priority Data

Jun. 28, 2023 (CN) .......................... 202310779425.6

(51) Int. Cl.
*G11B 27/031* (2006.01)
*G06F 3/0484* (2022.01)
*G11B 27/34* (2006.01)

(52) U.S. Cl.
CPC .......... *G11B 27/031* (2013.01); *G06F 3/0484* (2013.01); *G11B 27/34* (2013.01)

(58) Field of Classification Search
CPC ..... G11B 27/031; G11B 27/036; G11B 27/34; G06F 3/0484
See application file for complete search history.

(56) References Cited

U.S. PATENT DOCUMENTS

| | | | |
|---|---|---|---|
| 2010/0281404 A1* | 11/2010 | Langmacher | G06F 3/0484 715/762 |
| 2013/0085871 A1* | 4/2013 | Goss | G06Q 30/02 705/14.73 |
| 2014/0195921 A1* | 7/2014 | Grosz | G06Q 30/0631 715/738 |
| 2021/0104261 A1* | 4/2021 | Facer | G11B 27/031 |
| 2022/0374139 A1* | 11/2022 | Wehrman | G11B 27/34 |

\* cited by examiner

*Primary Examiner* — Thai Q Tran
*Assistant Examiner* — Jose M Mesa

(57) ABSTRACT

The present disclosure relates to a layout adjustment method and apparatus, a device, a storage medium, and a program product. The method includes: displaying a multimedia editing interface, where the multimedia editing interface includes a canvas, a material attribute panel, a material display area and a track editing area, and the canvas is configured to display a multimedia image corresponding to multimedia data; and adjusting, in response to receiving an adjustment operation on the canvas, size information and/or position information of the canvas based on the adjustment operation. In the multimedia editing interface of embodiments of the present disclosure, a user can adaptively adjust the size and position of the canvas, and display other areas in a transparent manner, such that the user can view the multimedia image displayed on the entire canvas at any time.

19 Claims, 7 Drawing Sheets

Display a multimedia editing interface, wherein the multimedia editing interface comprises a canvas, a material attribute panel, a material display area, and a track editing area, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material — S110

Adjust, in response to receiving an adjustment operation on the canvas, size information and/or position information of the canvas based on the adjustment operation, wherein the canvas is located on a first layer, the material attribute panel, the material display area, and the track editing area are located on a second layer, the first layer is located below the second layer, and the second layer is displayed according to set transparency — S120

S110: Display a multimedia editing interface, wherein the multimedia editing interface comprises a canvas, a material attribute panel, a material display area, and a track editing area, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material S120: Adjust, in response to receiving an adjustment operation on the canvas, size information and/or position information of the canvas based on the adjustment operation, wherein the canvas is located on a first layer, the material attribute panel, the material display area, and the track editing area are located on a second layer, the first layer is located below the second layer, and the second layer is displayed according to set transparency

Fig. 1

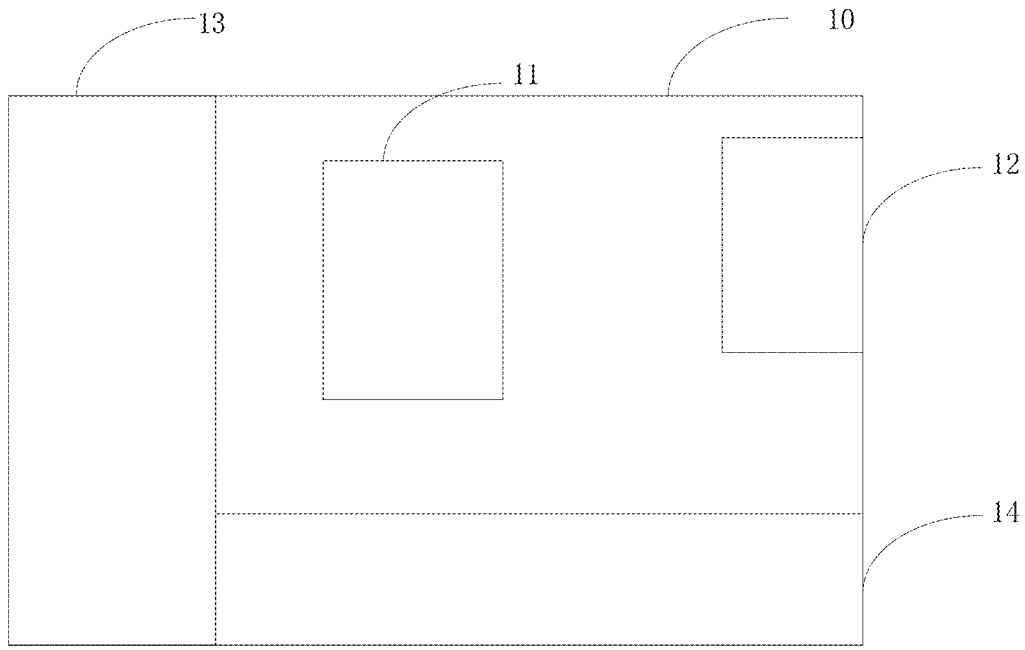

Fig. 2 ns, embodi- 35
LAYOUT ADJUSTMENT METHOD AND APPARATUS, DEVICE, STORAGE MEDIUM, AND PROGRAM PRODUCT

CROSS REFERENCE TO RELATED APPLICATION

The present application claims the priority to Chinese Patent Application No. 202310779425.6, filed on Jun. 28, 2023, and entitled "LAYOUT ADJUSTMENT METHOD AND APPARATUS, DEVICE, STORAGE MEDIUM, AND PROGRAM PRODUCT", which is incorporated in its entirety herein by reference.

FIELD

The present disclosure relates to the technical field of computer processing, in particular to a layout adjustment method and apparatus, a device, a storage medium, and a program product.

BACKGROUND

A variety of video platforms based on electronic devices have been commonly used with the rapid development of computer technology and mobile communication technology, notably enriching our daily life. An increasing number of users are willing to edit video footage on video editing platforms to get high-quality videos.

So how to adjust a video editing interface is a pressing issue.

SUMMARY

In order to solve the above technical problems, embodiments of the present disclosure provide a layout adjustment method and apparatus, a device, a storage medium, and a program product, which solve the problem of adjusting a layout in a video editing interface.

In a first aspect, embodiments of the present disclosure provide a layout adjustment method. The layout adjustment method includes: displaying a multimedia editing interface, where the multimedia editing interface includes a canvas, a material attribute panel, a material display area and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material; and adjusting, in response to receiving an adjustment operation on the canvas, size information and/or position information of the canvas based on the adjustment operation, where the canvas is located on a first layer, the material attribute panel, the material display area, and the track editing area are located on a second layer, the first layer is located below the second layer, and the second layer is displayed according to set transparency.

In a second aspect, embodiments of the present disclosure provide a layout adjustment apparatus. The layout adjustment apparatus includes: an interface display module, configured to display a multimedia editing interface, where the multimedia editing interface includes a canvas, a material attribute panel, a material display area and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material; and a canvas adjustment module, configured to adjust, in response to receiving an adjustment operation on the canvas, size information and/or position information of the canvas based on the adjustment operation, where the canvas is located on a first layer, the material attribute panel, the material display area, and the track editing area are located on a second layer, the first layer is located below the second layer, and the second layer is displayed according to set transparency.

In a third aspect, embodiments of the present disclosure provide an electronic device. The electronic device includes: one or more processors; and a memory configured to store one or more programs, where when the one or more programs are executed by the one or more processors, the one or more processors are caused to implement the above layout adjustment method according to any one of items in the first aspect.

In a fourth aspect, embodiments of the present disclosure provide a computer-readable storage medium, storing a computer program. The program, when executed by a processor, implements the layout adjustment method according to any one of items in the first aspect.

In a fifth aspect, embodiments of the present disclosure provide a computer program product, including a computer program or instruction. The computer program or instruction, when executed by a processor, implements the layout adjustment method according to any one of items in the first aspect.

Embodiments of the present disclosure provide a layout adjustment method and apparatus, a device, a storage medium, and a program product. The method includes: displaying a multimedia editing interface, where the multimedia editing interface includes a canvas, a material attribute panel, a material display area and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material; and adjusting, in response to receiving an adjustment operation on the canvas, a size and/or position of the canvas based on the adjustment operation, where the canvas is located on a first layer, the material attribute panel, the material display area and the track editing area are located on a second layer, the first layer is located below the second layer, and the second layer is displayed according to set transparency. In the multimedia editing interface in embodiments of the present disclosure, a user can adaptively adjust the size and position of the canvas, and display other areas in a transparent manner, such that the user may view the multimedia image displayed on the entire canvas at any time.

BRIEF DESCRIPTION OF THE DRAWINGS

The above and other features, advantages, and aspects of embodiments of the present disclosure will become more apparent with reference to the following particular embodiments in conjunction with the drawings. The same or similar reference numerals refer to the same or similar elements throughout the drawings. It should be understood that the drawings are schematic, and that the parts and elements are not necessarily drawn to scale.

FIG. 1 is a schematic flowchart of a layout adjustment method according to embodiments of the present disclosure;

FIG. 2 is a schematic diagram of a multimedia editing interface according to embodiments of the present disclosure;

DETAILED DESCRIPTION OF EMBODIMENTS

Figure 3A:
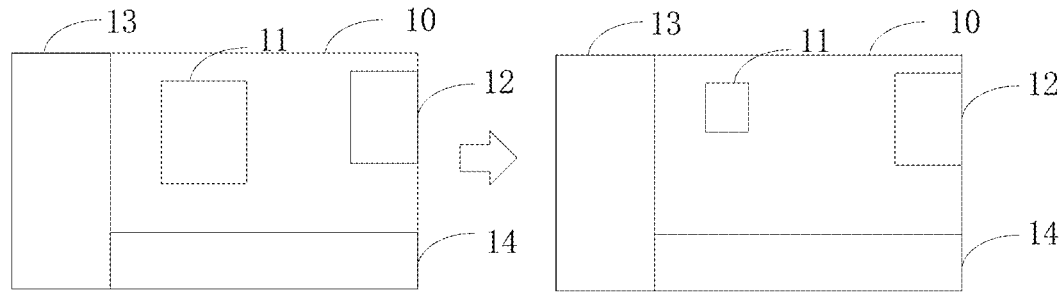
FIG. 3a is a schematic diagram of adjustment of a canvas according to embodiments of the present disclosure.

Embodiments of the present disclosure are described in more detail below with reference to the drawings. Although some embodiments of the present disclosure are shown in the drawings, it should be understood that the present disclosure may be embodied in various forms and should not be construed as limited to the embodiments set forth herein, but rather, these embodiments are provided so that the present disclosure will be more thorough and complete. It should be understood that the drawings and embodiments of the present disclosure are for illustrative purposes merely and are not intended to limit the scope of protection of the present disclosure.

It should be understood that various steps recited in the method embodiments of the present disclosure can be performed in different orders and/or in parallel. Furthermore, the method embodiments can include additional steps and/or omit to execute the illustrated steps. The scope of the present disclosure is not limited in this respect.

As used herein, the term "comprise" or "include" and their variations are open-ended, that is, "comprise but not limited to" and "include but not limited to". The term "based on" is "based at least in part on". The term "an embodiment" means "at least one embodiment". The term "another embodiment" means "at least one further embodiment". The term "some embodiments" means "at least some embodiments". Definitions for other terms are given in the description below.

It should be noted that concepts such as "first" and "second" mentioned in the present disclosure are merely used to distinguish different apparatuses, modules or units, and are not used to limit the order of functions executed by these apparatuses, modules or units or their interdependence.

It should be noted that the modification with "a", "an" or "a plurality of" in the present disclosure is intended to be illustrative rather than limitative, and should be understood by those skilled in the art as "one or more" unless the context clearly dictates otherwise.

The names of messages or information exchanged between a plurality of apparatuses in the embodiments of the present disclosure are merely for illustrative purposes, and are not intended to limit the scope of these messages or information.

Before the embodiments of the present disclosure are further described in detail, the nouns and terms involved in the embodiments of the present disclosure are explained, and the nouns and terms involved in the embodiments of the present disclosure are applicable to the following explanations.

In response to is used to represent a dependent condition or state of an executed operation. The one or more executed operations may be real-time or may have a set delay when the dependent condition or state is satisfied. Unless otherwise specified, there is no limitation on the order in which the operations are executed.

Hereinafter, embodiments of the present disclosure will be described in detail with reference to the drawings. It should be noted that the same reference numerals in different drawings will be used to refer to the same elements already described.

FIG. 1 is a flowchart of a layout adjustment method according to embodiments of the present disclosure. The embodiment is applicable to adjustment of an assembly layout in a multimedia editing interface. The method may be executed by a layout adjustment apparatus, and the layout adjustment apparatus may be implemented in software and/or hardware.

As shown in FIG. 1, the layout adjustment method according to embodiments of the present disclosure mainly includes steps S110-S120:

S110, a multimedia editing interface is displayed, where the multimedia editing interface includes a canvas, a material attribute panel, a material display area and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material.

In an embodiment of the present disclosure, the multimedia editing interface may be understood as an interface provided by a multimedia editing platform for a user to edit multimedia data. The multimedia editing platform may be a video editing application (APP) or a video editing program on a Web side. The multimedia editing platform is not specifically limited in embodiments of the present disclosure.

As shown in FIG. 2, the multimedia editing interface 10 provided in embodiments of the present disclosure includes a canvas 11, a material attribute panel 12, a material display area 13, and a track editing area 14. The canvas 11 is configured to display a multimedia image corresponding to multimedia data.

In embodiments of the present disclosure, the canvas 11 may be adjusted in size, scale, and position in the multimedia interface according to an adjustment operation of a user. The canvas 11 is configured to display a image corresponding to the multimedia data, and candidate materials in the material display area may also be added to the canvas 11. Further, in response to a selection operation on a material displayed in the canvas, a material attribute panel corresponding to the material may be displayed, and further an attribute of the material may be set.

The material attribute panel 12 is configured to set an attribute of a material in the multimedia data in response to a user operation. In embodiments of the present disclosure, the material attribute panel 12 includes a video panel, an audio panel, a sticker panel, a transition panel, a filter panel, a special effect panel, a image material panel, etc.

The video panel is categorized into different attribute panels according to different video types. Attribute panels of a main track video with sound include: a display parameter panel, a background panel, a matting panel, an animation effect panel, a speed panel, and an audio panel. Attribute panels of a main track video without sound include: a display parameter panel, a background panel, a matting panel, an animation effect panel, and a speed panel. Attribute panels of a non-main track video with sound include: a display parameter panel, a matting panel, an animation effect panel, a speed panel, and an audio panel. Attribute panels of a non-main track video without sound include: a display parameter panel, a matting panel, an animation effect panel, and a speed panel.

The display parameter panel supports slide bar adjustment and percentage value input to adjust a transparency of a video material, supports slide bar adjustment and percentage value input to adjust a size of a video, supports X and Y input value input to adjust a position of a video material, and supports angle input to adjust a tilt angle of a video material.

The background panel includes a color set panel, a blur set panel, and a format set panel. The color set panel includes a historical color control, a default color control, and a color selection control. The historical color control records historical colors used by a user, supports color picking, and supports not-selection. The default color control displays a plurality of common default colors for selection. The color selection control displays all colors, and is clicked to appear a selected state. The blur set panel displays a plurality of blur candidate items and displays a selected state in response to a click operation of a user on a blur candidate item. The format set panel displays a plurality of candidate format items and displays a selected state in response to a click operation of a user on a candidate format item. A key of apply is clicked, and after an adding success, it is prompted that the background is added; and after an adding failure, it is prompted that the background fails to be added, please try again. A key of apply globally is clicked, a set background can be applied to all multimedia clips.

The matting panel displays a title of automatic matting, a subtitle of automatic portrait recognition matting, and a matting switch control. The matting switch control is configured to determine whether to start an automatic matting function for an image in response to a user operation.

The animation effect panel includes support for settings of an entrance animation effect, an exit animation effect, and a loop animation effect. The settings of the entrance animation effect, the exit animation effect, and the loop animation effect support concurrency, instead of being mutually-exclusive. The user can select an entrance animation effect and then continue to select an exit animation effect and/or a loop animation effect, which will appear as a selected state. Further, if a position of a material selected by the user is not a first screen, an interface is positioned to a position of the selected material when the user has selected the material and enters the panel again. Animation duration can be set. The animation duration is determined according to a length of the material in a track. For example, a paragraph occupies 6 s of track duration, and then a total length of duration adjustment is 6 s. When there is only an entrance animation effect, longest entrance animation duration is total duration of an element. When there are an entrance animation effect and an exit animation effect, the longest duration of the sum of these two animations is the total duration of the element. When there is a loop animation effect, duration of the loop animation effect is increased for adjustment, and the longest total duration of the sum of these three animations is the total duration of the element.

The audio panel supports slide bar adjustment and percentage value input to adjust a volume, supports slide bar adjustment and percentage value input to adjust entrance duration and exist duration of an audio, and supports a noise reduction setting. A noise reduction switch is turned on to perform noise reduction processing on the audio. Prompt information that noise reduction succeeds is displayed when noise reduction succeeds, and prompt information that noise reduction fails, please try again is displayed when noise reduction fails. The audio panel supports a setting of an audio state, and displays a plurality of audio materials. An audio material displays a selected state after being selected. After the selected audio is clicked, the beginning of the selected material is automatically positioned to start playing. A playback time is equal to the length of the material.

The speed panel supports slide bar adjustment and percentage value input to adjust a video playback speed, supports sliding adjustment and value input to adjust video duration, and supports switch on or off a pitch.

The sticker panel includes a sticker animation effect set panel and a sticker parameter set panel. The sticker animation effect set includes support for settings of an entrance animation effect, an exit animation effect, and a loop animation effect. The settings of the entrance animation effect, the exit animation effect, and the loop animation effect support concurrency, instead of being mutually-exclusive. The user can select an entrance animation effect and then continue to select an exit animation effect and/or a loop animation effect, which will appear as a selected state. Further, if a position of a material selected by the user is not a first screen, an interface is positioned to a position of the selected material when the user has selected the material and enters the panel again. Animation duration can be set. The animation duration is determined according to a length of the material in a track. For example, a paragraph occupies 6 s of track duration, and then a total length of duration adjustment is 6 s. When there is only an entrance animation effect, longest entrance animation duration is total duration of an element. When there are an entrance animation effect and an exit animation effect, the longest duration of the sum of these two animations is the total duration of the element. When there is a loop animation effect, duration of the loop animation effect is increased for adjustment, and the longest total duration of the sum of these three animations is the total duration of the element.

The transition panel may support slide bar adjustment and percentage value input to adjust a transition time.

The filter panel may support slide bar adjustment and percentage value input to adjust filter strength.

The special effect panel supports adjustment of open attributes of each special effect, and the open attributes include name, blur, horizontal chromatic aberration, etc.

The image material panel includes an image parameter set panel, a matting set panel, and a sliding effect set panel. The image parameter set panel supports slide bar adjustment and percentage value input to adjust a transparency of an image material, supports slide bar adjustment and percentage value input to adjust a size of an image, supports X and Y input value input to adjust a position of the image, and supports angle input to adjust a tilt angle of the image. Further, when the user directly drags the material/video to adjust a position of the material/video on the canvas, or change the size of the material/video, parameters in the image parameter set panel will change accordingly. The matting set panel displays a title of automatic matting, a subtitle of automatic portrait recognition matting, and a matting switch control. The matting switch control is configured to determine whether to start an automatic matting function for an image in response to a user operation. The sliding effect set panel supports settings of an entrance animation effect, an exit animation effect, and a loop animation effect. The settings of the entrance animation effect, the exit animation effect, and the loop animation effect support concurrency, instead of being mutually-exclusive. The user can select an entrance animation effect and then continue to select an exit animation effect and/or a loop animation effect, which will appear as a selected state. Further, if a position of a material selected by the user is not a first screen, an interface is positioned to a position of the selected material when the user has selected the material and enters the panel again. Animation duration can be set. The animation duration is determined according to a length of the material in a track. For example, a paragraph occupies 6 s of track duration, and then a total length of duration adjustment is 6 s. When there is only an entrance animation effect, longest entrance animation duration is total duration of an element. When there are an entrance animation effect and an exit animation effect, the longest duration of the sum of these two animations is the total duration of the element. When there is a loop animation effect, duration of the loop animation effect is increased for adjustment, and the longest total duration of the sum of these three animations is the total duration of the element.

The material display area 13 is configured to display candidate materials and add a material selected by the user to the multimedia data. The material display area 13 includes a video, an image, music, text and other candidate materials, supports material search and automatic adaptation, and supports addition of a material displayed in the material display area 13 to the multimedia data.

The track editing area 14 is configured to display the multimedia data on a multimedia editing track, the material in the multimedia data is displayed as an editing track clip on the multimedia editing track according to editing information in the multimedia data, and the editing information is configured to indicate an editing operation on the material.

The track editing area 14 includes at least a video track, an audio track, a text track, and an effect track. The video track is configured to carry a video clip, the text track is configured to carry a letter text clip, the audio track is configured to carry an audio clip, and the effect track is configured to carry a set effect of a material. The user may perform editing operations on materials carried on each track in the track editing area. The editing operations include deleting a material, adjusting a position of a material in a timeline, adding a material from the material display area, etc.

S120: in response to receiving an adjustment operation on the canvas, size information and/or position information of the canvas is adjusted based on the adjustment operation.

In embodiments of the present disclosure, the adjustment operations on the canvas include a first adjustment operation on the canvas and a second adjustment operation on the canvas. The first adjustment operation is mainly configured to adjust the size of the canvas, and the second adjustment operation is mainly configured to adjust the position of the canvas.

In an embodiment of the present disclosure, the step of adjusting, in response to receiving an adjustment operation on the canvas, size information of the canvas based on the adjustment operation includes: scaling the size information of the canvas based on a scaling ratio corresponding to the first adjustment operation in response to receiving a first adjustment operation on the canvas, where the first adjustment operation includes at least one of an operation of inputting a scaling ratio by the user, an operation of selecting a preset scaling ratio by the user, and a sliding operation on a first physical key by the user. The sliding operation is associated with the scaling ratio.

In embodiments of the present disclosure, scaling the size information of the canvas is to scale up or down the size of the entire canvas. For example, the canvas has an original size of 1080*1920, and a scale-down ratio is 50%, such that the canvas has a size of 504*960 after being scaled down; and a scale-up ratio is 50%, such that the canvas has a size of 1620*2880 after being scaled up.

Figure 3B:
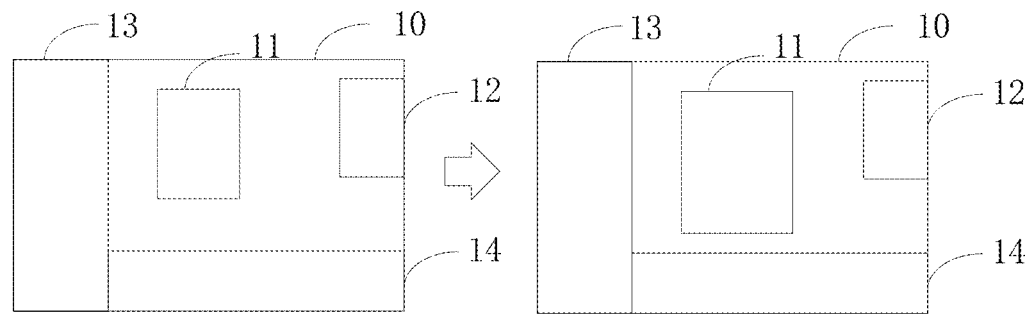
FIG. 3b is another schematic diagram of adjustment of a canvas according to embodiments of the present disclosure.

In an embodiment of the present disclosure, as shown in FIG. 3a, after the first adjustment operation is performed on the canvas, the canvas is scaled down according to a ratio corresponding to the first adjustment operation. As shown in FIG. 3b, after the second adjustment operation is performed on the canvas, the canvas is scaled up according to a ratio corresponding to the first adjustment operation.

In an embodiment of the present disclosure, the multimedia editing interface as shown in FIG. 2 includes a canvas size scaling control, displays a scaling ratio selection panel in response to a trigger operation on the canvas size scaling control, selects a scaling ratio of the canvas in the scaling ratio selection panel, and scales the canvas according to the selected scaling ratio. The scaling ratio selection panel displays a plurality of preset ratios. The preset ratios include: 50%, 100%, 200%, and an adaptive ratio. The adaptive ratio is to match a size of a current browser by taking a long edge of the canvas as a benchmark.

In an embodiment of the present disclosure, in response to a trigger operation on the canvas size scaling control, a canvas size scale input box is displayed on the multimedia editing interface as shown in FIG. 2. In response to an input operation on the canvas size scale input box, an input ratio corresponding to the input operation is obtained, and the canvas is displayed according to the input ratio.

In an embodiment of the present disclosure, the multimedia editing interface includes a canvas adjustment mode control as shown in FIG. 2. In response to a trigger operation on the canvas adjustment mode control, the canvas is in a size adjustable mode. In this case, in response to a sliding operation on the first physical key, a scaling ratio of the canvas is determined based on a sliding direction and a sliding distance corresponding to the sliding operation. Specifically, the sliding direction is associated with scaling down and up of the canvas. For example: sliding up corresponds to scaling down of the canvas, and sliding down corresponds to scaling up of the canvas. The sliding distance is associated with the scaling ratio of the canvas. For example, the sliding distance is 1 mm, and a corresponding scaling ratio is 10%. It should be noted that an association relation between the sliding direction and the scaling down and up of the canvas, and an association relation between the sliding distance and the scaling ratio of the canvas may be set according to actual conditions, which are not specifically limited in embodiments of the present disclosure. The first physical key may be a touch pad or a wheel of a mouse, which is not specifically limited in embodiments of the present disclosure.

In an embodiment of the present disclosure, when the multimedia editing interface is loaded for the first time, the canvas is scaled to match the size of the current browser. Further, during scaling the size in a scaled manner, the canvas is scaled displayed based on the long side as a benchmark. Further, after initial loading, the size of the canvas remains unchanged when the user resizes the browser again.

In an embodiment of the present disclosure, adjusting a position of the canvas in the multimedia editing interface in response to the second adjustment operation on the canvas includes: switching a canvas mode to a dragging mode in response to a switching operation on the canvas mode; and when the canvas mode is a dragging mode, in response to receiving a sliding operation by the user on a second physical key, moving the canvas to a target position corresponding to the sliding operation.

Figure 3C:
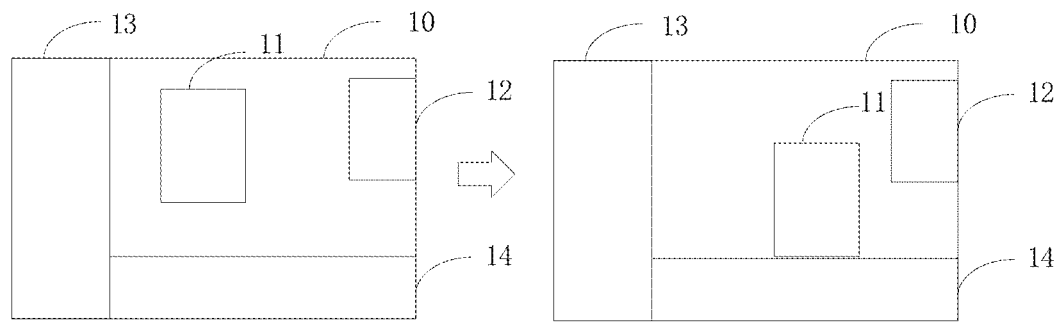
FIG. 3c is yet another schematic diagram of adjustment of a canvas according to embodiments of the present disclosure.

In an embodiment of the present disclosure, as shown in FIG. 3c, the canvas may be dragged from a current position to the target position in response to the second adjustment operation on the canvas.

In an embodiment of the present disclosure, when the canvas is in the dragging mode, a dragging operation may be implemented through a left button of a mouse. For example, in response to a sliding operation executed while a user performs a long-press operation on the mouse, a dragging direction and a dragging distance of the canvas are determined according to a sliding direction and a sliding distance corresponding to the sliding operation, and canvas drag stops in response to a release operation on the mouse, and a position where the canvas stops is displayed.

In an embodiment of the present disclosure, in response to a sliding operation on a touch pad, a dragging direction and a dragging distance of the canvas are determined based on a sliding direction and a sliding distance corresponding to the sliding operation. The sliding direction is associated with the dragging direction, and the sliding distance is associated with the dragging distance.

In an embodiment of the present disclosure, in response to a sliding operation on a shortcut key and a mouse wheel, a dragging direction and a dragging distance of the canvas are determined based on a sliding direction and a sliding distance corresponding to the sliding operation. The canvas is dragged longitudinally in response to a rolling operation on the mouse wheel. The canvas is dragged transversely in response to a rolling operation on the mouse wheel after a triggering operation on a shift key.

In an embodiment of the present disclosure, in response to receiving a third adjustment operation on the canvas, a canvas scale of the canvas is adjusted to a target canvas scale based on a target canvas scale corresponding to the third adjustment operation.

In embodiments of the present disclosure, the canvas scale refers to a proportion of a width to a height of the canvas. For example, the canvas scale may be 4:3, 16:9, etc. In embodiments of the present disclosure, in response to a trigger operation on a canvas scale control, a canvas scale selection panel is displayed, a canvas scale is selected from the canvas scale selection panel, and the canvas scale is adjusted according to the selected canvas scale. The canvas scale selection panel displays a plurality of preset scales, and the preset scales include 4:3, 16:9, etc.

In an embodiment of the present disclosure, the method further includes: pausing the multimedia image corresponding to the multimedia data in response to receiving a canvas adjustment instruction, and marking a pause time point; and continuing to play the multimedia image corresponding to the multimedia data from the pause time point in response to receiving a canvas adjustment end instruction.

In the embodiment of the present disclosure, a video is paused when the canvas is scaled and dragged, and the video continues to be played when scaling and dragging stop. When the canvas plays the video corresponding to the multimedia data, the video is paused in response to the canvas adjustment operation executed by the user. After canvas adjustment is complete, the video continues to be played. The canvas adjustment includes one or more of scaling ratio adjustment, position dragging, and canvas scale adjustment.

In an embodiment of the present disclosure, after current resolution adaptation and 9:16 are switched, the font size changes with the canvas and is unreadable. After what is switched is maintained, the canvas is filled according to an actual scale, and the font size remains unchanged.

In embodiments of the present disclosure, default font size adjustment of newly created text includes: adjust a default font size to a first set font size in landscape scale, and adjust the default font size to a second set font size in portrait scale.

Figure 4:
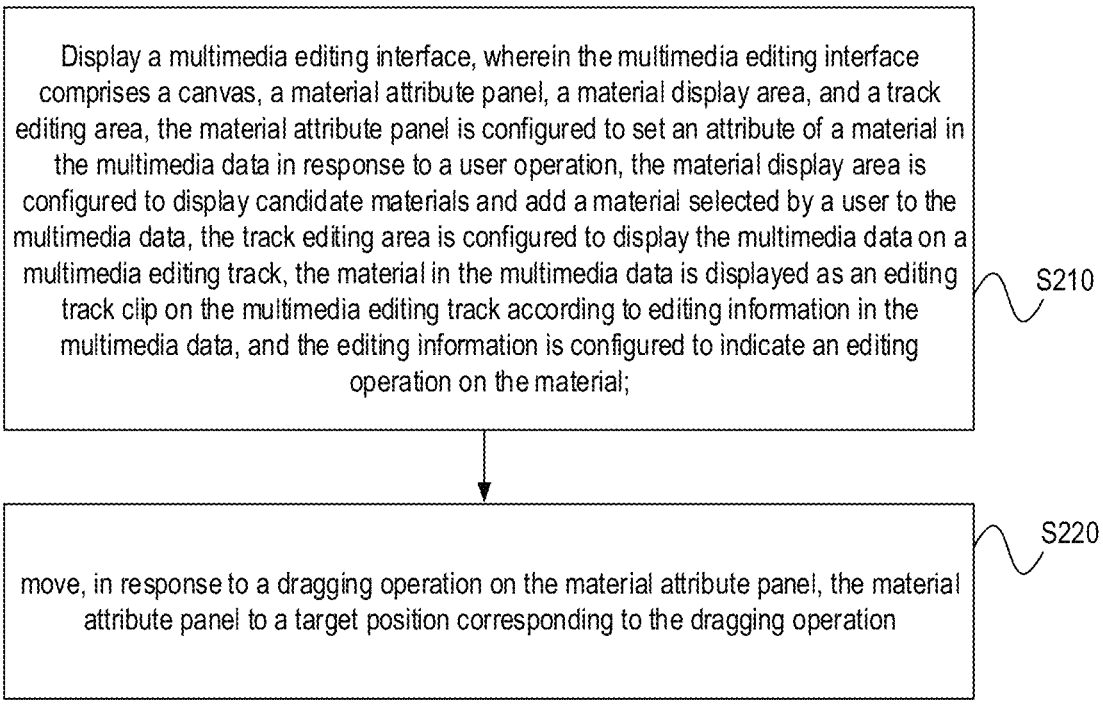
FIG. 4 is a schematic flowchart of a method for dragging a material attribute panel according to embodiments of the present disclosure.

In an embodiment of the present disclosure, on the basis of the above embodiments, a method for adjusting a material attribute panel is provided. As shown in FIG. 4, the layout adjustment method according to embodiments of the present disclosure mainly includes steps S210-S220:

S210, a multimedia editing interface is displayed, where the multimedia editing interface includes a canvas, a material attribute panel, a material display area, and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material.

An execution flow of S210 provided in the embodiment of the present disclosure is the same as that of S110 provided in the above embodiment. For details, reference may be made to the description in the above embodiment, which is not repeated in the embodiment of the present disclosure.

S220, in response to a dragging operation for the material attribute panel, the material attribute panel is moved to a target position corresponding to the dragging operation.

Figure 5:
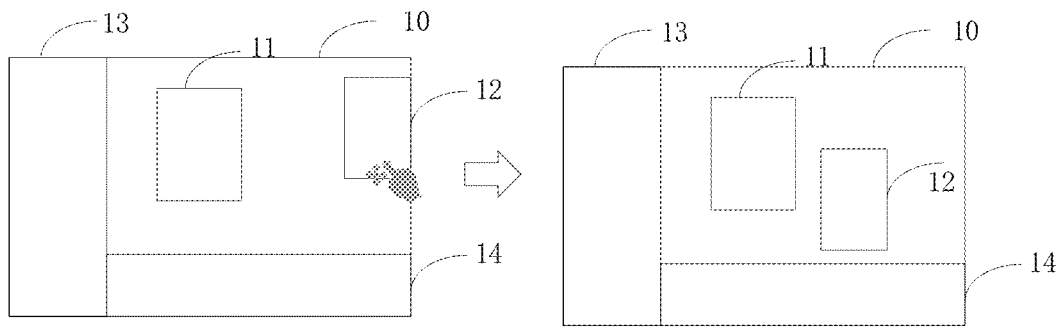
FIG. 5 is a schematic diagram for dragging a material attribute panel according to embodiments of the present disclosure.

In embodiments of the present disclosure, the material attribute panel is movably displayed according to a dragging operation by the user, and a layer where the material attribute panel is located is the uppermost layer in the multimedia editing interface. As shown in FIG. 5.

In an embodiment of the present disclosure, when the user switches an attribute tag or switches a selected element, the position of the material attribute panel is unchanged. In a single edit of the same multimedia data, the position of the material attribute panel is memorized, and is restored to a default position after the material attribute panel is opened next time. After the multimedia data is switched or reopened, the position of the material attribute panel returns to the default position.

In an embodiment of the present disclosure, the material attribute panel is displayed in the multimedia editing interface in response to a trigger operation on the material attribute control. In embodiments of the present disclosure, a plurality of material attribute controls may be displayed in the multimedia editing interface, and in response to a trigger operation on the material attribute control, a material attribute panel corresponding to the trigger operation is displayed, where an attribute content displayed in the material attribute panel is associated with the control corresponding to the trigger operation.

In embodiments of the present disclosure, in a state where no material is selected/added, the material attribute panel is not displayed by default.

In an embodiment of the present disclosure, the material attribute panel corresponding to an added material is displayed in the multimedia editing interface in response to a material adding operation.

In embodiments of the present disclosure, after any material with an attribute panel is added, the corresponding material attribute panel is displayed, and a topmost panel is expanded by default.

In embodiments of the present disclosure, under the condition that there is no operation of closing the material attribute panel by the user, the material attribute panel remains expanded, the user clicks on any material on the screen/adds a new material, and the material attribute panel automatically switches to a top tag of the corresponding material.

In an embodiment of the present disclosure, the user clicks on a close button in an upper right corner of the material attribute panel, or clicks on a selected item in a primary tag again to close the material attribute panel.

In an embodiment of the present disclosure, under the condition that the user manually closes the material attribute panel, there are two ways to re-invoke the panel: one is to click on an attribute bar control on the right to invoke the material attribute panel corresponding to the corresponding control; and the other is to double-click on the material on the canvas to invoke the material attribute panel corresponding to the material.

In an embodiment of the present disclosure, in a material loading process, the material attribute control is not clickable, and the material attribute panel is not expanded.

In an embodiment of the present disclosure, when a height of an attribute content in the material attribute panel is greater than a height of the material attribute panel, the attribute content in the material attribute panel is controlled to be displayed in a scrolling manner in response to a sliding operation in the material attribute panel.

In embodiments of the present disclosure, the height of the content of the material attribute panel is overflowed to support scroll, and the title is topped.

In an embodiment of the present disclosure, a height of the material attribute panel changes along with a height of an attribute content in the material attribute panel.

In embodiments of the present disclosure, a height of the material attribute panel changes along with a height of an attribute content in the material attribute panel adaptively. That is to say, when the attribute content is relatively high, the height of the material attribute panel is increased accordingly, and when the attribute content is relatively low, the height of the material attribute panel is decreased accordingly. In other words, the attribute content adaptively fills the entire material attribute panel.

Figure 6:
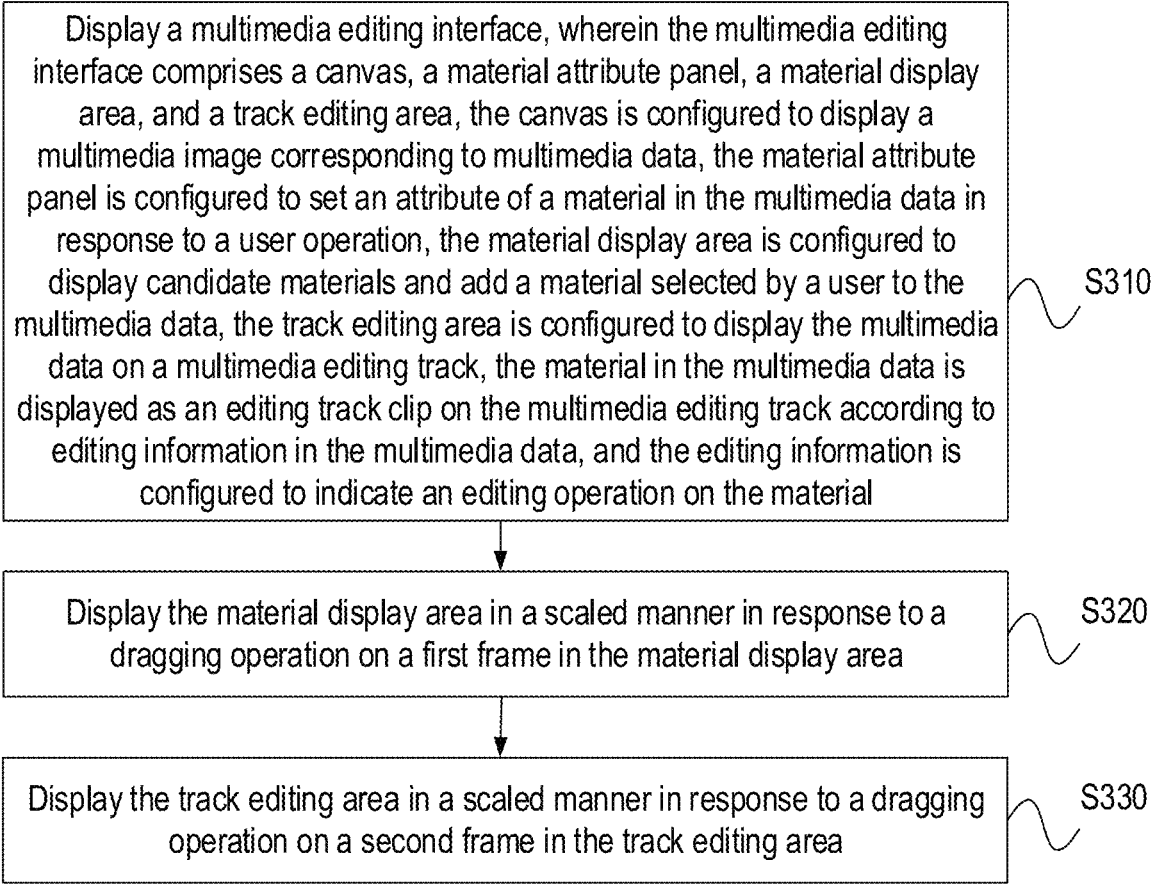
FIG. 6 is a schematic flowchart of a method for adjusting a multimedia editing interface according to embodiments of the present disclosure.

Based on the above embodiments, the layout adjustment method is further optimized in the embodiments of the present disclosure. As shown in FIG. 6, the layout adjustment method according to embodiments of the present disclosure mainly includes steps S310-S330.

S310, a multimedia editing interface is displayed, where the multimedia editing interface includes a canvas, a material attribute panel, a material display area, and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material.

An execution flow of S310 provided in the embodiment of the present disclosure is the same as that of S110 provided in the above embodiment. For details, reference may be made to the description in the above embodiment, which is not repeated in the embodiment of the present disclosure.

S320, the material display area is displayed in a scaled manner in response to a dragging operation on a first frame in the material display area.

Figure 7:
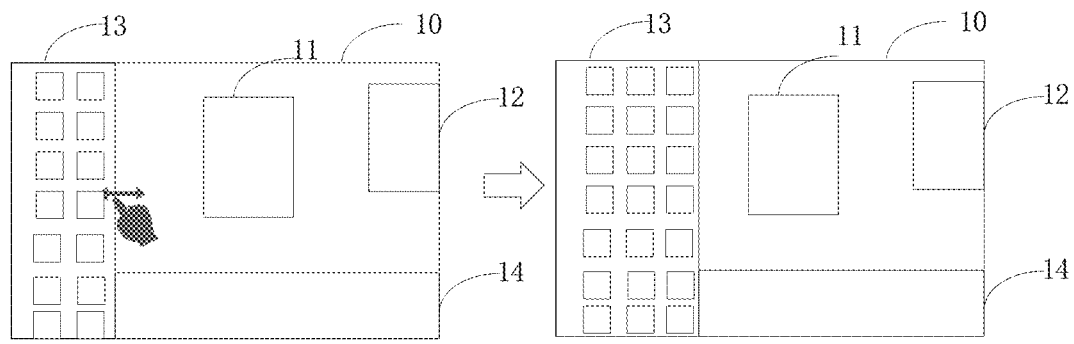
FIG. 7 is a schematic diagram of adjustment of a material display area according to embodiments of the present disclosure.

In embodiments of the present disclosure, the first frame is a frame close to the canvas area. As shown in FIG. 7, in response to a dragging operation on the first frame, the material display area 13 is displayed in a scaled manner. Further, as shown in FIG. 7, when the first frame is dragged rightwards, the material display area is scaled up. The material display area is scaled up means that the material display area has a height unchanged and only a width direction is scaled up. Further, when the first frame is dragged leftwards, the material display area is scaled down.

The material display area is scaled down means that the material display area has a height unchanged and only a width direction is scaled down.

In embodiments of the present disclosure, a material card in the material display area is displayed along with the material display area in a scaled manner during scaling of the material display area.

In embodiments of the present disclosure, during scaling of the material display area, a material card displayed in the material display area is subjected to adaptive scaling. Specifically, during scaling up of the material display area, under the condition that the width of the material display area reaches a set value, a row of material display cards are added, and a new material card is added at the bottom of the material display area. During scaling up of the material display area, under the condition that the width of the material display area is reduced to reach a set value, a row of material display cards are reduced.

S330, the track editing area is displayed in a scaled manner in response to a dragging operation on a second frame in the track editing area.

Figure 8:
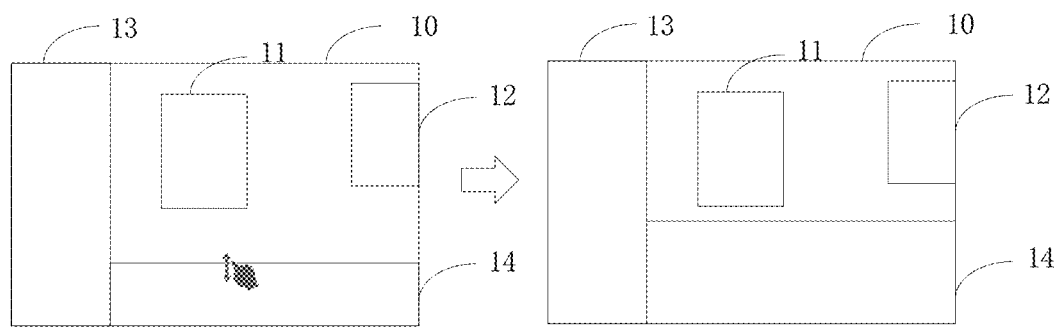
FIG. 8 is a schematic diagram of adjustment of a track editing area according to embodiments of the present disclosure.

In embodiments of the present disclosure, the second frame is a frame of the track editing area close to the canvas area. As shown in FIG. 8, in response to a dragging operation on the second frame, the track editing area 14 is displayed in a scaled manner. Further, as shown in FIG. 8, when the second frame is dragged upwards, the track editing area is scaled up. The track editing area is scaled up means that the track editing area has a width unchanged and only a height direction is scaled up. Further, when the second frame is dragged downwards, the track editing area is scaled down. The track editing area is scaled down means that the track editing area has a width unchanged and only a height direction is scaled down.

It should be noted that there is no sequential dependent relation between S320 and S330, and either one of the two steps may be executed first, or only one of the two steps may be executed.

In an embodiment of the present disclosure, the canvas is located on a first layer, the material attribute panel, the material display area and the track editing area are located on a second layer, the first layer is located below the second layer, and the second layer is displayed according to set transparency.

In embodiments of the present disclosure, an area or panel of a layer above the canvas is displayed according to a certain transparency, such that no matter how large the canvas is, the user can intuitively see a image content in the canvas, so as to perform editing operations.

In an embodiment of the present disclosure, when there is an overlapping area between the canvas and a set area, the overlapping area is displayed according to set transparency. The set area includes at least one of the material attribute panel, the material display area or the track editing area.

Figure 9A:
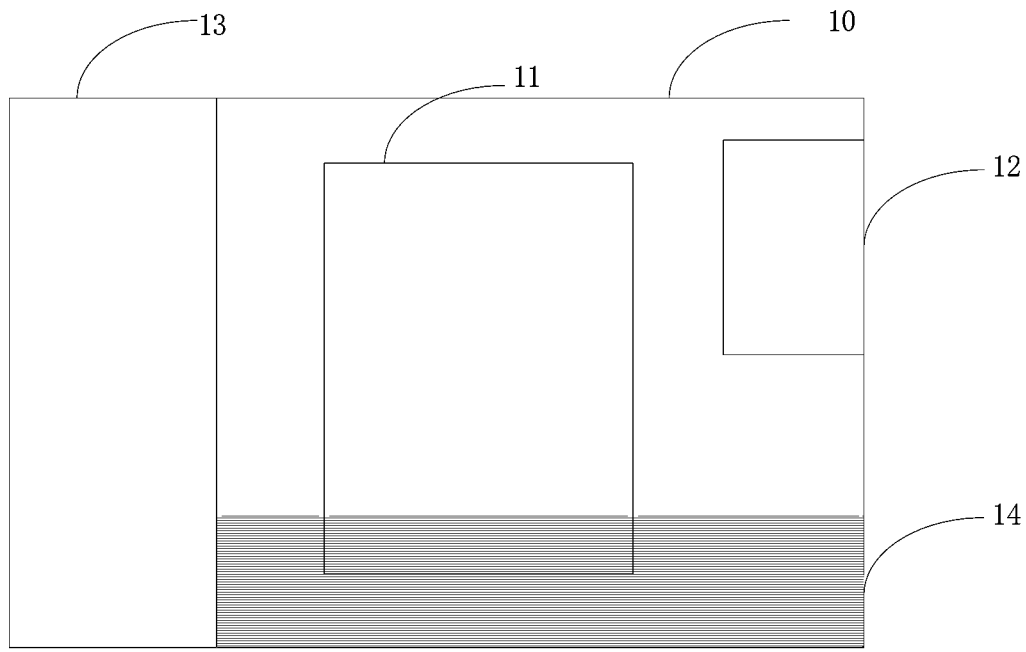
FIG. 9a is a schematic diagram illustrating overlapping of a track editing area and a canvas according to embodiments of the present disclosure.

In embodiments of the present disclosure, as shown in FIG. 9a, when there is an overlapping area between the canvas 11 and the track editing area 14 in a process of scaling up or moving the canvas, the track editing area 14 is displayed according to the set transparency. The set transparency may be set according to actual conditions.

Figure 9B:
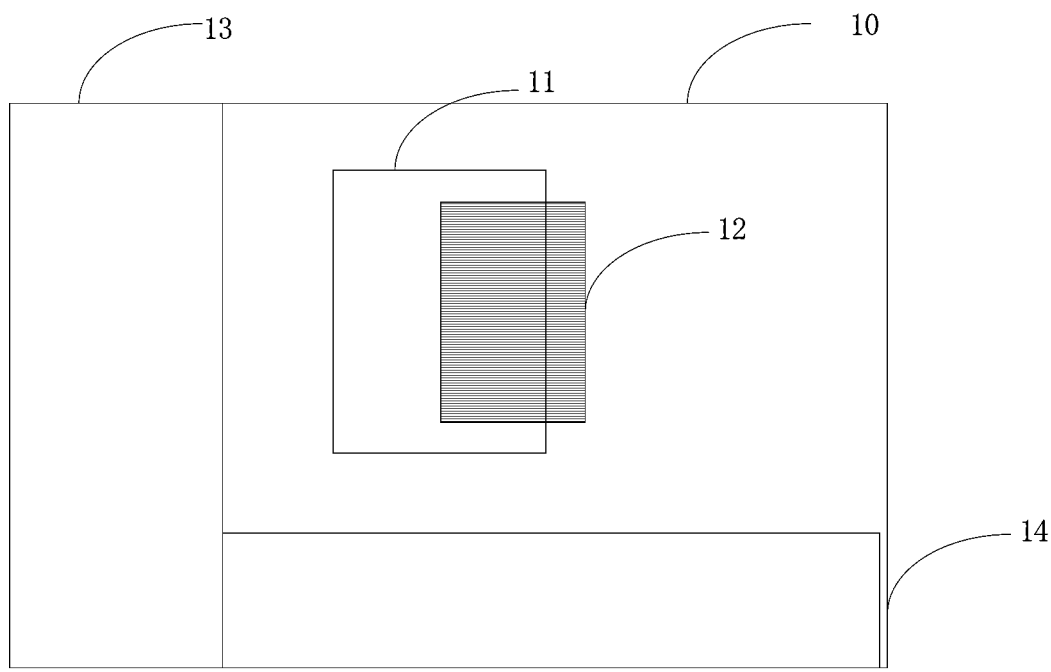
FIG. 9b is a schematic diagram illustrating overlapping of a material attribute panel and a canvas in embodiments of the present disclosure.

In embodiments of the present disclosure, as shown in FIG. 9b, when there is an overlapping area between the canvas 11 and the material attribute panel 12 in a process of scaling up or moving the canvas, or in a process of dragging the material attribute panel 12, the material attribute panel 12 is displayed according to the set transparency. The set transparency may be set according to actual conditions.

Figure 10:
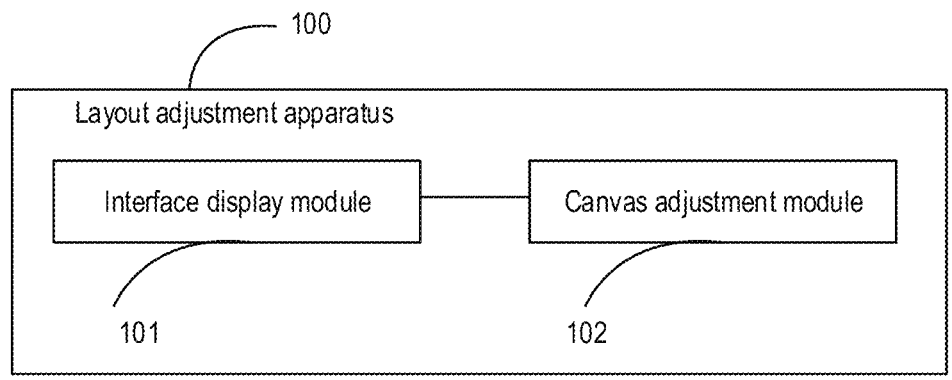
FIG. 10 is a schematic structural diagram of a layout adjusting apparatus according to embodiments of the present disclosure.

FIG. 10 is a schematic structural diagram of a layout adjusting apparatus according to embodiments of the present disclosure. The embodiment is applicable to adjustment of an assembly layout in a multimedia editing interface. The layout adjustment apparatus may be implemented in software and/or hardware.

As shown in FIG. 10, the layout adjustment apparatus according to embodiments of the present disclosure mainly includes an interface display module 101 and a canvas adjustment module 102.

The interface display module 101 is configured to display a multimedia editing interface, where the multimedia editing interface includes a canvas, a material attribute panel, a material display area, and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material.

The canvas adjustment module 102 is configured to adjust, in response to receiving an adjustment operation on the canvas, size information and/or position information of the canvas based on the adjustment operation, where the canvas is located on a first layer, the material attribute panel, the material display area and the track editing area are located on a second layer, the first layer is located below the second layer, and the second layer is displayed according to set transparency.

In an embodiment of the present disclosure, the apparatus further includes an overlapping area display module, configured to display, when there is an overlapping area between the canvas and a set area, the overlapping area according to set transparency, where the set area includes at least one of the material attribute panel, the material display area, and/or the track editing area.

In an embodiment of the present disclosure, the apparatus further includes a video playing module, configured to pause the multimedia image corresponding to the multimedia data in response to receiving a canvas adjustment instruction, and mark a pause time point; and continue to play the multimedia image corresponding to the multimedia data from the pause time point in response to receiving a canvas adjustment end instruction.

In an embodiment of the present disclosure, the material attribute panel is displayed in a popover form, and the apparatus further includes a material attribute panel adjustment module, configured to move, in response to a dragging operation on the material attribute panel, the material attribute panel to a target position corresponding to the dragging operation.

In an embodiment of the present disclosure, the apparatus further includes a material attribute panel display module, configured to display the material attribute panel in the multimedia editing interface in response to a trigger operation on the material attribute control; and alternatively, display the material attribute panel corresponding to an added material in the multimedia editing interface in response to a material adding operation.

In an embodiment of the present disclosure, the material attribute panel adjustment module is specifically configured to display, when a height of an attribute content in the material attribute panel is greater than a height of the material attribute panel, the attribute content in the material attribute panel in a scrolling manner in response to a sliding operation in the material attribute panel; and alternatively, change a size of the material attribute panel along with a size of an attribute content in the material attribute panel.

In an embodiment of the present disclosure, the apparatus further includes an area scaling module, configured to control the material display area to be displayed in a scaled manner in response to a dragging operation on a first frame in the material display area; and alternatively, control the track editing area to be displayed in a scaled manner in response to a dragging operation on a second frame in the track editing area.

In an embodiment of the present disclosure, the apparatus further includes a material card adjustment module, configured to control a material card in the material display area to be displayed along with the material display area in a scaled manner during scaling of the material display area.

The layout adjustment apparatus provided in embodiments of the present disclosure can execute steps executed in the layout adjustment method provided in the method embodiment of the present disclosure, and the execution steps and beneficial effects are not repeated herein.

Figure 11:
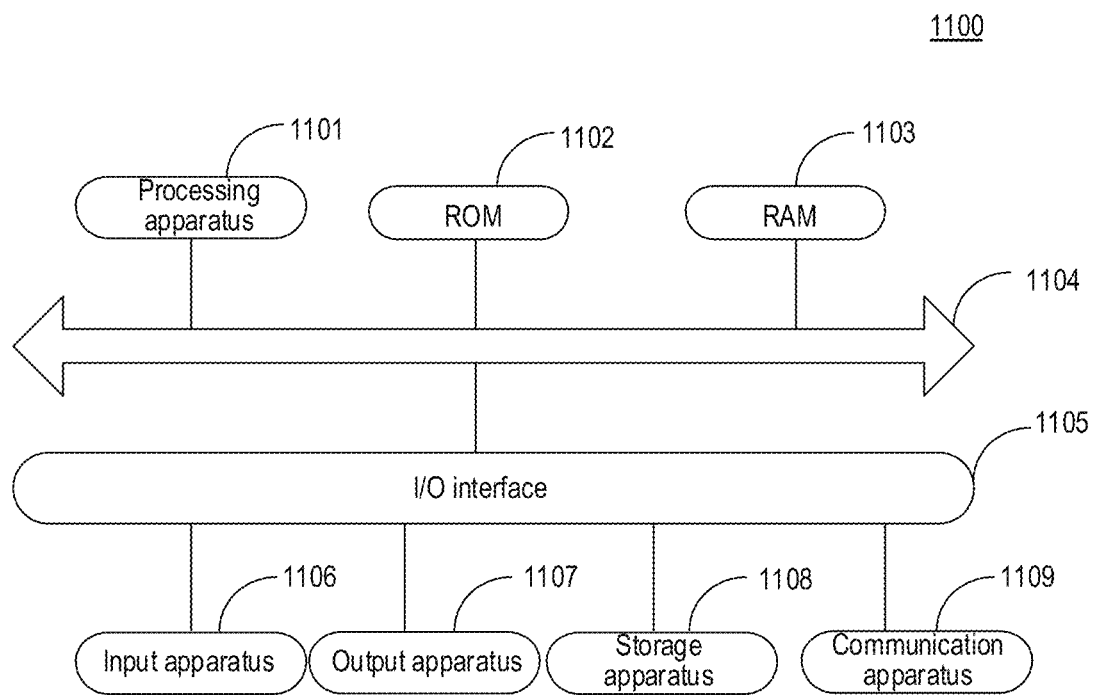
FIG. 11 is a schematic structural diagram of an electronic device according to embodiments of the present disclosure.

FIG. 11 is a schematic structural diagram of an electronic device according to embodiments of the present disclosure. With specific reference to FIG. 11 below, a schematic structural diagram suitable for implementing an electronic device 1100 in an embodiment of the present disclosure is shown. The electronic device 1100 in the embodiment of the present disclosure may include, but is not limited to, mobile terminals such as mobile phones, notebook computers, digital broadcast receivers, personal digital assistants (PDA), tablet computers (PAD), portable multimedia players (PMP), in-vehicle terminals (for example, in-vehicle navigation terminals), wearable terminal devices, etc., and fixed terminals such as digital televisions (TV), desktop computers, smart home devices, etc. The electronic device illustrated in FIG. 11 is merely an instance and should not impose any limitation on the functions and scope of use of the embodiments of the present disclosure.

As shown in FIG. 11, the electronic device 1100 may include a processing apparatus (for example, a central processing unit, a graphics processing unit, etc.) 1101 that may execute various appropriate actions and processes according to programs stored in a read-only memory (ROM) 1102 or programs loaded from a storage apparatus 1108 into a random-access memory (RAM) 1103, so as to implement the layout adjustment method in the embodiments as described in the present disclosure. The RAM 1103 also stores various programs and data needed for the operations of the terminal device 1100. The processing apparatus 1101, the ROM 1102, and the RAM 1103 are connected to each other by means of a bus 1104. An input/output (I/O) interface 1105 is also connected to the bus 1104.

Typically, the following apparatuses may be connected to the I/O interface 1105: an input apparatus 1106 including, for example, a touch screen, a touch pad, a keyboard, a mouse, a camera, a microphone, an accelerometer, a gyroscope, etc.; an output apparatus 1107 including, for example, a liquid crystal display (LCD), a speaker, a vibrator, etc.; a storage apparatus 1108 including, for example, a magnetic tape, a hard disk, etc.; and a communication apparatus 1109. The communication apparatus 1109 may allow the terminal device 1100 to be in wireless or wired communication with other devices to exchange data. While FIG. 11 illustrates a terminal device 1100 having various apparatuses, it should be understood that not all of the illustrated apparatuses are required to be implemented or provided. More or fewer apparatus may alternatively be implemented or provided.

In particular, according to embodiments of the present disclosure, a processes described above with reference to the flowcharts may be implemented as a computer software program. For example, embodiments of the present disclosure include a computer program product. The computer program product includes a computer program carried on a non-transitory computer-readable medium, and the computer program includes a program code for executing the method illustrated in the flowchart, thereby implementing the layout adjustment method as described above. In such embodiments, the computer program may be downloaded and installed from a network by means of the communication apparatuses 1109, or installed from the storage device 1108, or installed from the ROM 1102. When executed by the processing apparatus 1101, the computer program executes the above-described functions defined in the method of embodiments of the present disclosure.

It should be noted that the computer-readable medium in the present disclosure may be a computer-readable signal medium or a computer-readable storage medium, or any combination of a computer-readable signal medium and a computer-readable storage medium. The computer-readable storage medium may be, for example, but is not limited to, an electronic, magnetic, optical, electromagnetic, infrared, or semiconductor system, apparatus, or device, or any combination of the foregoing. More specific instance of the computer-readable storage medium may include, but is not limited to, an electrical connection based on one or more wires, a portable computer diskette, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing. In the present disclosure, the computer-readable storage medium may be any tangible medium that includes or stores a program for use by or in conjunction with an instruction execution system, apparatus, or device. In the present disclosure, the compute-readable signal medium may include a data signal propagating in a baseband or as part of a carry wave and carrying a computer-readable program code. Such a propagated data signal may have a variety of forms and may include, but is not limited to, an electromagnetic signal, an optical signal, or any suitable combination of the foregoing. The computer-readable signal medium may also be any computer-readable medium besides a computer-readable storage medium. The computer-readable signal medium can send, propagate, or transmit a program for use by or in conjunction with an instruction execution system, apparatus, or device. A program code included on a computer-readable medium may be transmitted by means of any suitable medium, including, but not limited to, wires, fiber optic cables, radio frequency (RF), etc., or any suitable combination of the foregoing.

In some embodiments, a client side and a server may communicate by using any currently known or future developed network protocol, such as a hypertext transfer protocol (HTTP), and may be interconnected with any form or medium of digital data communication (for example, a communication network). Instances of communication networks include a local area network ("LAN"), a wide area network ("WAN"), Internet work (for example, the Internet), and an end-to-end network (for example, an ad hoc end-to-end network), as well as any currently known or future developed network.

The computer-readable medium may be included in the above electronic device, and may also exist independently without being assembled into the electronic device.

The computer-readable medium carries one or more programs. When the one or more programs are executed by the terminal device, the terminal device may be caused to: display a multimedia editing interface, where the multimedia editing interface includes a canvas, a material attribute panel, a material display area and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material; and the canvas is located on a first layer, the material attribute panel, the material display area and the track editing area are located on a second layer, the first layer is located below the second layer, and the second layer is displayed according to set transparency.

Alternatively, when the above one or more programs are executed by the terminal device, the terminal device may further execute other steps described in the above embodiments.

A computer program code for performing operations of the present disclosure may be written in one or more programming languages, or combinations of the programming languages. The programming languages include, but are not limited to, object-oriented programming languages, such as Java, Smalltalk, and C++, and further include conventional procedural programming languages, such as the C programming language or similar programming languages. The program code may be executed entirely on a user computer, partly on a user computer, as a stand-alone software package, partly on a user computer and partly on a remote computer, or entirely on a remote computer or server. In the case involving a remote computer, the remote computer may be connected with a user computer through any kind of network, including a local area network (LAN) or a wide area network (WAN), or may be connected with an external computer (for example, connected through the Internet by using an Internet service provider).

The flowcharts and block diagrams in the accompanying drawings illustrate the architecture, functionality, and operation possibly implemented by the systems, methods, and computer program products according to various embodiments of the present disclosure. In this regard, each block in the flowcharts or block diagrams may represent a module, a program segment, or a portion of a code, and a module, a program segment, or a portion of a code includes one or more executable instructions for implementing a specified logical function. It should also be noted that in some alternative implementations, a function noted in a block may occur in a different order than noted in the figures. For example, two consecutive blocks may actually be executed substantially in parallel, or in a reverse order sometimes, depending on a function involved. It should also be noted that each block in the block diagrams and/or flowcharts, and combinations of blocks in the block diagrams and/or flowcharts, can be implemented by special purpose hardware-based systems that perform specified functions or operations, or can be implemented by combinations of special purpose hardware and computer instructions.

The units described in embodiments of the present disclosure may be implemented in software or hardware. The name of a unit does not constitute a qualification of the unit itself under certain circumstances.

The functions described above herein may be executed at least partially by one or more hardware logic components. For example, without limitation, exemplary types of the hardware logic components that may be used include: field programmable gate array (FPGA), application specific integrated circuit (ASIC), application specific standard product (ASSP), system on chip (SOC), complex programmable logic device (CPLD), etc.

In the context of the present disclosure, the machine-readable medium may be a tangible medium that may include or store a program for use by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific instance of the machine-readable storage medium may include an electrical connection based on one or more wires, a portable computer diskette, a hard disk, a random-access memory (RAM), a read-only memory (ROM), an erasable programmable read-only memory (EPROM or flash memory), an optical fiber, a portable compact disc read-only memory (CD-ROM), an optical storage device, a magnetic storage device, or any suitable combination of the foregoing.

The above description is merely illustrative of preferred embodiments of the present disclosure and of principles of the technology employed. It should be understood by those skilled in the art that the disclosed scope involved in the present disclosure is not limited to the technical solutions in which the above-described technical features are specifically combined, but encompasses other technical solutions in which the above-described technical features or equivalent features thereof are arbitrarily combined without departing from the concept of the present disclosure, for example, technical solutions formed by interchanging the features described above with (non-limitative) technical features disclosed in the present disclosure that have similar functions.

Furthermore, although operations are depicted in a particular order, this should not be understood as requiring that such operations be performed in the particular order shown or in a sequential order. In certain circumstances, multitasking and parallel processing may be advantageous. Similarly, although several specific implementation details are included in the above discussion, these details should not be construed as limitations on the scope of the present disclosure. Some features that are described in the context of separate embodiments may also be implemented in combination in a single embodiment. Conversely, various features described in the context of a single embodiment can also be implemented in multiple embodiments separately or in any suitable sub-combination.

Although the subject matter has been described in language specific to structural features and/or methodological logical actions, it should be understood that the subject matter defined in the appended claims is not necessarily limited to the specific features or actions described above. Rather, the specific features and actions described above are merely instance forms of implementing the claims.

What is claimed is:

1. A layout adjustment method, comprising:
   displaying a multimedia editing interface, wherein the multimedia editing interface comprises a canvas, a material attribute panel, a material display area, and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material;
   adjusting, in response to receiving an adjustment operation on the canvas, size information and/or position information of the canvas based on the adjustment operation, wherein
   the canvas is located on a first layer, the material attribute panel, the material display area, and the track editing area are located on a second layer, the first layer is located below the second layer, and the second layer is displayed according to set transparency; and
   controlling, based on determining that a height of an attribute content in the material attribute panel is greater than a height of the material attribute panel, the attribute content in the material attribute panel to be displayed in a scrolling manner in response to a sliding operation in the material attribute panel.

2. The layout adjustment method according to claim 1, further comprising:
   displaying, based on determining that there is an overlapping area between the canvas and a set area, the overlapping area according to set transparency, wherein the set area comprises at least one of the material attribute panel, the material display area, or the track editing area.

3. The layout adjustment method according to claim 1, further comprising:
   pausing the multimedia image corresponding to the multimedia data in response to receiving a canvas adjustment instruction, and marking a pause time point; and
   continuing to play the multimedia image corresponding to the multimedia data from the pause time point in response to receiving a canvas adjustment end instruction.

4. The layout adjustment method according to claim 1, wherein the material attribute panel is displayed in a popover form, and the method further comprises:
   moving, in response to a dragging operation on the material attribute panel, the material attribute panel to a target position corresponding to the dragging operation.

5. The layout adjustment method according to claim 1, further comprising:
   displaying the material attribute panel in the multimedia editing interface in response to a trigger operation on a material attribute control.

6. The layout adjustment method according to claim 1, further comprising:
   displaying the material attribute panel corresponding to an added material in the multimedia editing interface in response to a material adding operation.

7. The layout adjustment method according to claim 1, further comprising:
   controlling the material display area to be displayed in a scaled manner in response to a dragging operation on a first frame of the material display area.

8. The layout adjustment method according to claim 1, further comprising:
   controlling the track editing area to be displayed in a scaled manner in response to a dragging operation on a second frame of the track editing area.

9. The method according to claim 7, further comprising:
   displaying a material card in the material display area along with the material display area in a scaled manner during scaling of the material display area.

10. An electronic device, comprising:
    one or more processors; and
    a memory configured to store one or more programs, wherein
    when the one or more programs are executed by the one or more processors, the one or more processors are caused to implement operations comprising:
       displaying a multimedia editing interface, wherein the multimedia editing interface comprises a canvas, a material attribute panel, a material display area, and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material;
       adjusting, in response to receiving an adjustment operation on the canvas, size information and/or position information of the canvas based on the adjustment operation, wherein
    the canvas is located on a first layer, the material attribute panel, the material display area, and the track editing area are located on a second layer, the first layer is located below the second layer, and the second layer is displayed according to set transparency; and
       controlling, based on determining that a height of an attribute content in the material attribute panel is greater than a height of the material attribute panel, the attribute content in the material attribute panel to be displayed in a scrolling manner in response to a sliding operation in the material attribute panel.

11. The electric device according to claim 10, wherein the operations further comprise:
    displaying, based on determining that there is an overlapping area between the canvas and a set area, the overlapping area according to set transparency, wherein the set area comprises at least one of the material attribute panel, the material display area, or the track editing area.

12. The electric device according to claim 10, wherein the operations further comprise:
    pausing the multimedia image corresponding to the multimedia data in response to receiving a canvas adjustment instruction, and marking a pause time point; and
    continuing to play the multimedia image corresponding to the multimedia data from the pause time point in response to receiving a canvas adjustment end instruction.

13. The electric device according to claim 10, wherein the material attribute panel is displayed in a popover form, and the operations further comprise:
    moving, in response to a dragging operation on the material attribute panel, the material attribute panel to a target position corresponding to the dragging operation.

14. The electric device according to claim 10, wherein the operations further comprise:
    displaying the material attribute panel in the multimedia editing interface in response to a trigger operation on a material attribute control.

15. The electric device according to claim 10, wherein the operations further comprise:
    displaying the material attribute panel corresponding to an added material in the multimedia editing interface in response to a material adding operation.

16. The electric device according to claim 10, wherein the operations further comprise:
    controlling the material display area to be displayed in a scaled manner in response to a dragging operation on a first frame of the material display area.

17. A non-transitory computer-readable storage medium, storing a computer program thereon, wherein the program, when executed by a processor, implements operations comprising:
    displaying a multimedia editing interface, wherein the multimedia editing interface comprises a canvas, a material attribute panel, a material display area, and a track editing area, the canvas is configured to display a multimedia image corresponding to multimedia data, the material attribute panel is configured to set an attribute of a material in the multimedia data in response to a user operation, the material display area is configured to display candidate materials and add a material selected by a user to the multimedia data, the track editing area is configured to display the multimedia data on a multimedia editing track, the material in the multimedia data is displayed as an editing track clip on the multimedia editing track according to editing information in the multimedia data, and the editing information is configured to indicate an editing operation on the material;
    adjusting, in response to receiving an adjustment operation on the canvas, size information and/or position information of the canvas based on the adjustment operation, wherein
    the canvas is located on a first layer, the material attribute panel, the material display area, and the track editing area are located on a second layer, the first layer is located below the second layer, and the second layer is displayed according to set transparency; and
    controlling, based on determining that a height of an attribute content in the material attribute panel is greater than a height of the material attribute panel, the attribute content in the material attribute panel to be displayed in a scrolling manner in response to a sliding operation in the material attribute panel.

18. The electric device according to claim 16, wherein the operations further comprise:
    displaying a material card in the material display area along with the material display area in a scaled manner during scaling of the material display area.

19. The electric device according to claim 10, wherein the operations further comprise:
    controlling the track editing area to be displayed in a scaled manner in response to a dragging operation on a second frame of the track editing area.

* * * * *